United States Patent
Murayama et al.

(10) Patent No.: US 6,793,481 B2
(45) Date of Patent: Sep. 21, 2004

(54) INJECTION MOLDING DIE

(75) Inventors: Fujio Murayama, Niigata (JP);
Yoshihiro Horikawa, Niigata (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 10/260,692

(22) Filed: Sep. 27, 2002

(65) Prior Publication Data

US 2003/0068404 A1 Apr. 10, 2003

(30) Foreign Application Priority Data

Sep. 28, 2001 (JP) ..................... P2001-302743

(51) Int. Cl.[7] .............................. B29C 45/22
(52) U.S. Cl. .................. 425/564; 425/566; 425/572
(58) Field of Search ................. 425/564, 566, 425/572

(56) References Cited

U.S. PATENT DOCUMENTS 4,268,240 A * 5/1981 Rees et al. ................. 425/566

* cited by examiner

Primary Examiner—Tim Heitbrink
(74) Attorney, Agent, or Firm—Darby & Darby

(57) ABSTRACT

The present invention provides an injection molding die having a simplified valve gate and simplified attachment structures for the valve gate. The die includes: a first die 4 with a gate 7; a second die 20 forming, together with the first die 4, a molding cavity 23 that communicates with the gate 7; a manifold 10 containing a molding material supply path 12 communicating with the gate 7; a thermal insulation space 16 disposed between the first die 4 and the manifold 10; and a valve gate 24 disposed between the first die 4 and the manifold 10 opening and closing the gate. The valve gate 24 includes: a valve pin 25 passing through the first die 4 and the manifold 10 and opening and closing the gate 7; a sealing member 27 mounted on the manifold 10 where the valve pin 25 passes through and providing a seal between the manifold 10 and the first die 4; and a heater 29 heating the manifold 10.

9 Claims, 3 Drawing Sheets

PRIOR ART

US 6,793,481 B2

INJECTION MOLDING DIE

FIELD OF THE INVENTION

The present invention relates to an injection molding die in which molding material is fed to a molding cavity via a gate. More specifically, the injection molding die is equipped with a valve gate which includes a valve pin or the like for opening and closing the gate.

BACKGROUND OF THE INVENTION

An example of an injection molding die is shown in FIG. 3. This injection molding die 31 includes: a first die 34 having a gate 37; a second die 50 forming, together with the first die 34, a molding cavity 55 that communicates with the gate 37; a manifold 40 having a molding material supply path 42 that communicates with the gate 37; and a valve gate 56 disposed at the connection between the supply path 42 of the manifold 40 and the gate 37 of the first die 34.

The valve gate 56 includes: a roughly cylindrical main valve unit 57; a valve pin 58 inserted through the main valve unit 57 and opening and closing the gate 37 of the first die 34; and a heater 59 mounted on the outer perimeter of the main valve unit 57 and heating the main valve unit 57. The end of the main valve unit 57 abuts the perimeter edge of the gate 37 of the first die 34, and the rear end of the main valve unit 57 abuts the perimeter edge of the opening of the supply path 42 of the manifold 40, thus connecting the supply path 42 and the gate 37. In this configuration, the valve gate 56 is formed as a single, integral unit from the main valve unit 57, the valve pin 58, and the heater 59.

In injection molding die 31, the main valve unit 57, the valve pin 58, and the heater 59 are a single, integral unit valve gate 56. Thus, the individual elements of the valve gate 56 must be fitted to work with each other. As a result the structure of the valve gate 56 and the attachment structures for the valve gate 56 become complex. This results in more processing and assembly operations with respect to the valve gate 56, increasing its overall price. Furthermore, a complex structure is required for sealing the valve gate 56 itself to the section where the valve gate 56 attaches to the die. This also increases processing and assembly costs, which leads to higher prices overall.

SUMMARY OF THE INVENTION

An object of the present invention is to overcome the conventional problems described above. Accordingly, the present invention provides an injection molding die that simplifies the structure of the valve gate; the structures that attach the gate and the die; processing and assembly of the gate and the die; and the sealing section structure, all of which should keep the overall price of the die and gate lower.

Accordingly, the invention provides an injection molding die which comprises: a first die with a gate; a second die forming, together with the first die, a molding cavity that communicates with the gate; a manifold comprising a molding material supply path communicating with the gate; a thermal insulation space disposed between the first die and the manifold; and a valve gate disposed between the first die and the manifold, which opens and closes the gate. The valve gate comprises: a valve pin that passes through the first die and the manifold and which opens and closes the gate; a sealing member mounted on the manifold where the valve pin passes through, which provides a seal between the manifold and the first die; and a heater mounted on the manifold to heat molding material that flows through the supply path.

The valve pin opens the gate so that the molding material flows through the supply path of the manifold and is supplied to the molding cavity. The opening of the manifold should be sealed with the sealing member, which also may seal the connection between the manifold and the first die. The molding material flowing through the supply path of the manifold may be heated by the heater.

In a further embodiment, the sealing member comprises a pressure-receiving section at an area facing the supply path of the manifold; and a seal is made between the manifold and the first die as a result of pressure from the molding material flowing through supply path that is received by the pressure-receiving section. The pressure from the molding material flowing through the supply path in the manifold acts on the pressure-receiving section of the sealing member. This results in pressure to the sealing member, providing a seal between the manifold and the first die.

DETAILED DESCRIPTION OF THE INVENTION

Several embodiments of the present invention will be described with references to FIGS. 1 and 2.

Figure 1:
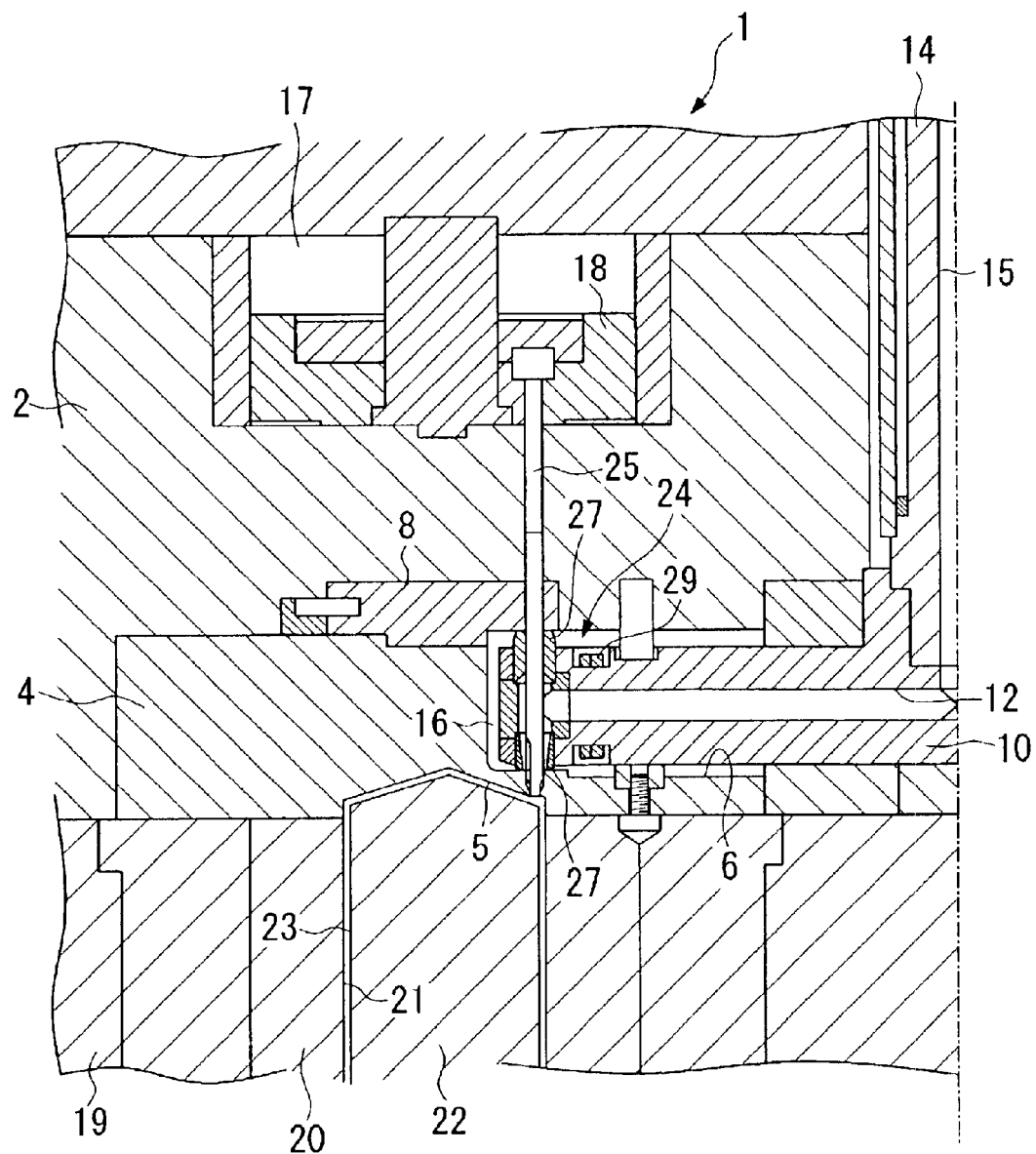
FIG. 1 is a cross-section of an injection mold die according to the present invention.
Figure 2:
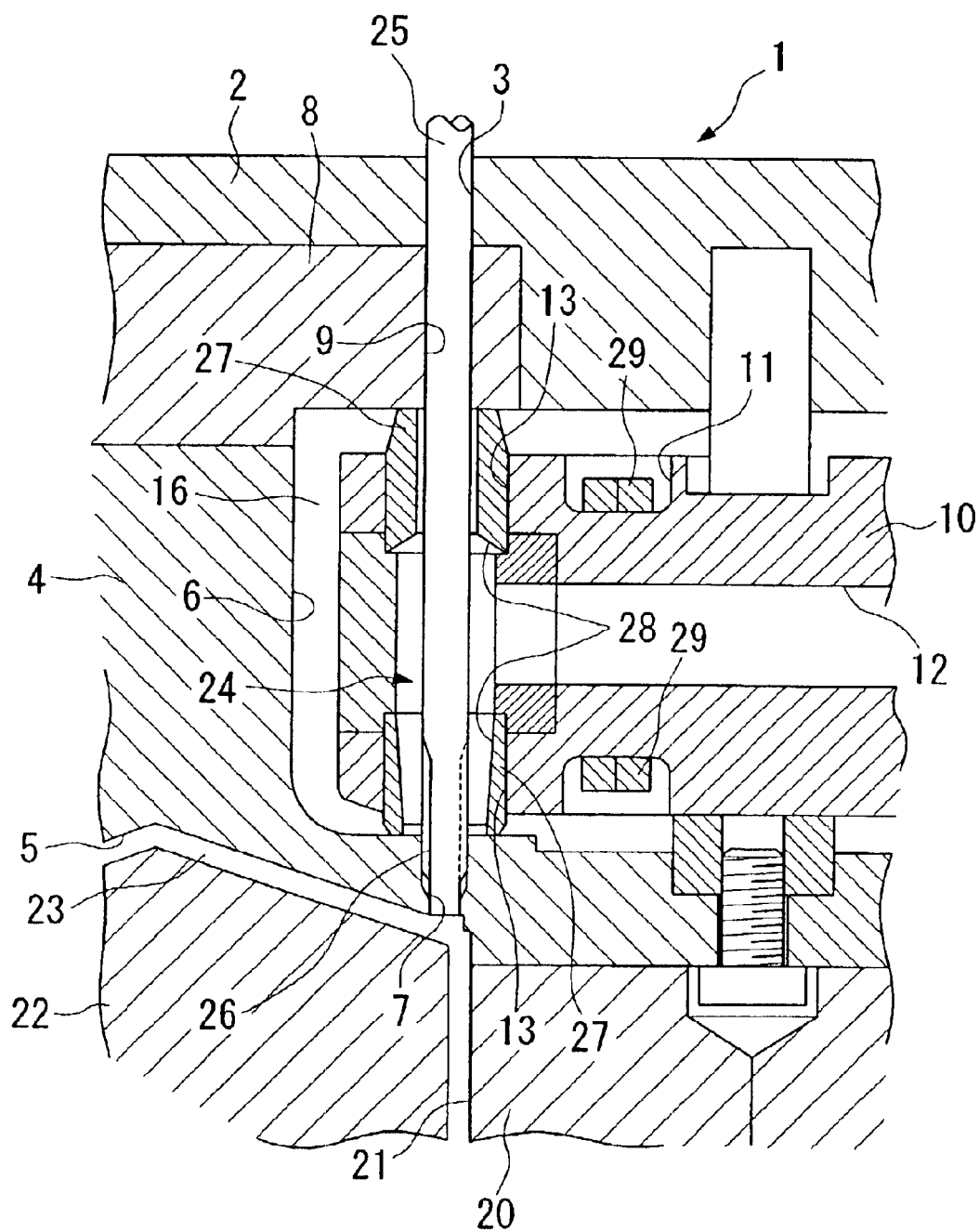
FIG. 2 is an enlarged cross-section detail of a portion of FIG. 1.
Figure 3:
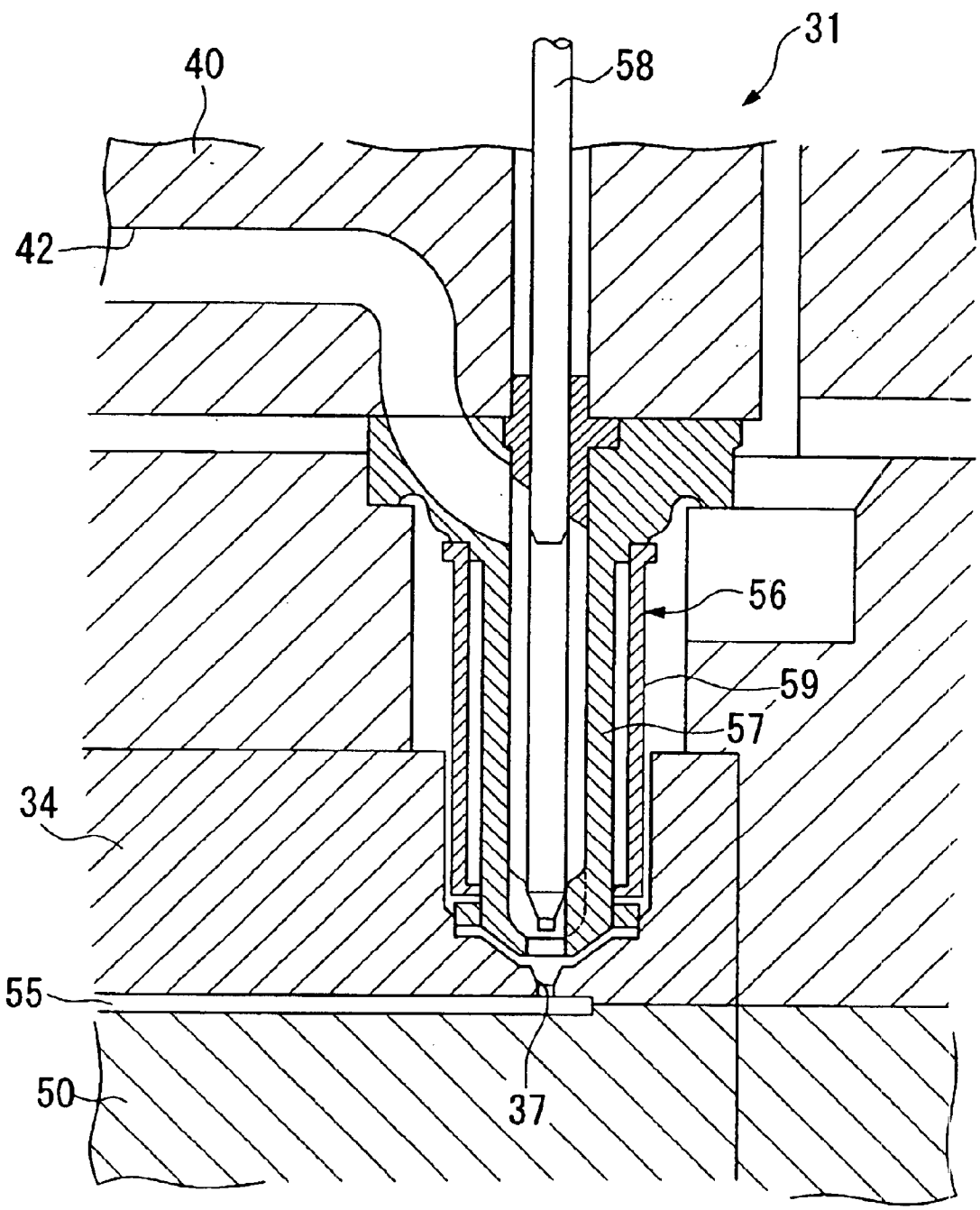
FIG. 3 is a cross-section of a prior art conventional injection molding die. 1: injection molding die; 4: first die; 7: gate; 10: manifold; 12: supply hole; 16: insulation space; 20: second die; 23: molding cavity; 24: valve seat; 25: valve pin; 27: sealing member; 28: pressure-receiving section; 29: heater

FIG. 1 and FIG. 2 illustrate one embodiment of an injection molding die according to the present invention. FIG. 1 is a cross section of the entire structure. FIG. 2 is a detail of part of that cross section.

The injection molding die 1 comprises: a first die 4 having a gate 7; a second die 20 forming, along with the first die 4, a molding space 23 that communicates with the gate 7; a manifold 10 having a path 12 communicating with the gate 7 to supply molding material; an insulation space 16 interposed between the first die 4 and the manifold 10; and a valve gate 24 for opening and closing the gate 7, interposed between the first die 4 and the manifold 10.

The first die 4 is formed as a plate and is attached to a central area of the lower surface of a secured die plate 2. A cavity 5 having a triangular cross-section is disposed toward the lower surface of the first die 4. This cavity 5 defines a section of the molding space 23. A cavity 6 is disposed at a central area and the upper surface of the first die 4. The gate 7 communicates with the cavity 5 at the lower surface of the first die 4 and also passes vertically through the cavity 6. The gate 7 is formed with a shape and size that allows the lower end of the valve pin 25 of the valve gate 24 to be fitted into it. A support plate 8 projects along the edge of the cavity 6 above the first die 4. A support hole 9 is formed in the support plate 8 at a position corresponding to the gate 7. The valve pin 25 of the valve gate 24 is able to move freely through the support hole 9.

The manifold 10 is formed as a plate and is attached in the cavity 6 on the upper surface of the first die 4 separated by a predetermined gap. This gap serves as an insulation space 16 that provides thermal insulation between the first die 4 and the manifold 10.

A horizontal supply path 12 for the molding material is disposed in the manifold 10. A valve pin insertion hole 13 is formed vertically through a section of the outer perimeter edge of the manifold 10 aligned with the gate 7. The supply hole 12 is formed so that it communicates with the valve pin insertion hole 13. The lower end of the supply pipe 14, which passes through the center of the secured die plate 2, is fitted in the center of the manifold 10. The supply path 12 is continuous with a molding material supply path 15 disposed in the inner perimeter of the supply pipe 14.

A cylinder chamber 17 is disposed above the secured die plate 2. A vertically movable plunger 18 is disposed in the cylinder chamber 17. The vertical motion of the plunger 18 is activated by hydraulic pressure in the cylinder chamber 17.

A second die 20 is attached to a movable die plate 19. The second die 20 moves in tandem with the movable die plate 19 and can move toward or away from the first die 4. A cavity 21 is disposed on the surface of the second die 20. The cavity 21 is formed at a position aligned with the lower surface of the first die 4. A core 22 is disposed in the cavity 21 at a predetermined distance from the inner surface of the cavity 21. A molding cavity 23 having a predetermined shape is formed by the perimeter surface of the core 22, the inner surface of the cavity 21 of the second die 20 and the inner surface of the cavity 5 of the first die 4.

The valve gate 24 includes a valve pin 25, a sealing member 27, and a heater 29. The upper end of the valve pin 25 is secured to the plunger 18. The valve pin 25 passes through a hole 3 formed on the secured die plate 2, a support hole 9 of the first die 4, and a hole 13 of the manifold 10. The lower end of the valve pin 25 is fitted into the gate 7 of the first die 4. The sealing member 27 is fitted inside the valve pin insertion hole 13 of the manifold 10. The heater 29 is mounted on the manifold 10.

The valve pin 25 is formed as a rod. Three grooves 26 having arcuate cross-sections are extended length-wise at equal perimeter intervals of the lower end of the valve pin 25. Molding material from the supply hole 12 is guided by these grooves 26 to the gate 7. When the gate 7 is closed, the bottom end of the valve pin 25 is fitted into the gate 7, sealing the gate 7. When the gate 7 is open, the bottom end of the valve pin 25 rises to the position indicated by the dotted lines in FIG. 2, thus opening the gate 7 and allowing the molding material to be fed into the molding cavity 23 from the supply hole 12.

The sealing member 27 is formed in a roughly cylindrical shape and is arranged coaxially with the valve pin 25. The upper side of the sealing member 27 projects upward from the valve pin insertion hole 13, and the upper end surface abuts the lower surface of the support plate 8 for the first die 4. The lower side of the sealing member 27 projects downward from the valve pin insertion hole 13, and the bottom end surface abuts the bottom surface of the cavity 6 of the first die 4.

A pressure-receiving section 28 is disposed on a section of the sealing member 27 facing the supply path 12. The pressure-receiving section 28 is tapered at a predetermined angle so that the side toward the supply path 12 has a larger diameter. When pressure from the molding material is applied to the pressure-receiving section 28, each sealing member is pressed diagonally upward or diagonally downward so that the upper end surface or the lower end surface presses strongly against the first die 4, thus providing a tight seal therebetween.

The gap between the inner perimeter surface of the upper side of the sealing member 27 and the perimeter surface of the valve pin 25 is small, while the gap between the inner perimeter surface of the lower side of the sealing member and the perimeter surface of the valve pin 25 is wide.

The heaters 29 are mounted in cavities 11 disposed on the upper and lower sides of the manifold 10. Electric heating bands and the like are effective for use as the heaters 29, but other types of heaters can be used instead. When the heater 29 is activated, the manifold 10 is heated, and the molding material flowing through the supply path 12 of the manifold 10 is kept in a flowable or molten state.

To mold an object using the injection molding die 1 described above, the movable die plate 19 is activated and the second die 20 is abutted against the first die 4. The molding cavity 23 is formed by the cavity 5 of the first die 4, the cavity 21 of the second die 20, and the core 22 of the second die 20.

Then, hydraulic pressure is used to raise both the plunger 18 and the valve pin 25 so that the lower end of the valve pin 25 is positioned near the supply path 12 of the manifold 10 and the gate 7 is opened. From this state, the molding material is guided through the supply path 15 of the supply pipe 14, the supply path 12 of the manifold 10, and the inner perimeter side of the sealing member 27, to reach the gate 7. The molding material is then fed into the molding cavity 23 via the gate 7.

Hydraulic pressure is then used to lower both the plunger 18 and the valve pin 25. The lower end of the valve pin 25 is fitted into the gate 7 so that the gate 7 is sealed. The molding material in the molding cavity 23 is then cooled and solidified. After a predetermined time has elapsed, the second die 20 is moved away from the first die 4 and the molded object is ejected from the molding cavity 23. As a result, a molded object having a shape matching the molding cavity 23 is formed.

In the injection molding die 1 according to the embodiment described above, the elements of the valve gate 24, i.e., the valve pin 25, the sealing member 27, and the heater 29, are formed as separate elements. Thus, there is no need to provide correlation between these different elements. This allows these elements to have simple structures and simplifies the attachment structures of these elements. As a result, processing and assembly is simple, processing and assembly costs can be reduced, and the overall product is less expensive. Furthermore, since the sealing action of the sealing member 27 is maintained with pressure from the molding material, the structure of the sealing member can be simplified, thus reducing processing and assembly costs and keeping the overall price down.

In the present invention as described above, the elements of the valve gate are formed as separate units, and each of these elements are attached separately to their respective positions. This eliminates the need for correlation or pre-assembly between the elements of the valve gate. Thus, the structures of the elements and the attachment structures for these elements can be simplified. This makes processing and assembly easier, leading to reduced processing and assembly costs, and keeping overall price down. Also, the sealing member maintains its seal through pressure received from the molding material. Thus, the structure of the sealing member and the attachment structure for the sealing member can be kept simple. This also reduces processing and assembly costs and keeps overall price down.

What is claimed is:

1. An injection molding die comprising: a first die having a gate; a second die forming, together with said first die, a molding cavity that communicates with said gate; a manifold containing a molding material supply path communicating with said gate; a thermal insulation space disposed between said first die and said manifold; and a valve gate disposed between said first die and said manifold opening and closing said gate;

wherein said valve gate comprises: a valve pin passing through said first die and said manifold adapted to open and close said gate; a sealing member mounted on said manifold where said valve pin passes through said manifold adapted to provide a seal between said manifold and said first die; and a heater mounted on said manifold adapted to heat molding material flowing through said supply path;

wherein said sealing member comprises a pressure-receiving section facing said supply path of said manifold; and said sealing member is adapted to provide a seal between said manifold and said first die as a result of pressure from said molding material flowing through supply path and received by said pressure-receiving section.

2. An injection molding die comprising: a first die having a gate; a second die forming, together with said first die, a molding cavity that communicates with said gate; a manifold containing a molding material supply path communicating with said gate; a thermal insulation space disposed between said first die and said manifold; and a valve gate disposed between said first die and said manifold opening and closing said gate;

wherein said valve gate comprises: a valve pin passing through said first die and said manifold adapted to open and close said gate; a sealing member mounted on said manifold where said first die; and a heater mounted on said manifold adapted to heat molding material flowing through said supply path;

wherein said sealing member has a cylindrical shape, said sealing member is mounted on said manifold concentrically with said valve pin, one end of said sealing member projects from said manifold to abut said first die, and the other end of said sealing member has a pressure-receiving section facing said molding material supply path molding material supply path.

3. An injection molding die as defined in claim 2, wherein said pressure-receiving section is tapered at a predetermined angle so that the side toward said supply path has a larger diameter than the side away from said supply path.

4. An injection molding die as defined in claim 1, further comprising a second sealing member mounted on said manifold, where said valve pin passes through said manifold adapted to provide a seal between said manifold and a die plate to which said first die is secured.

5. An injection molding die as defined in claim 4, wherein said second sealing member has a cylindrical shape, said sealing member is mounted on said manifold concentrically with said valve pin, one end of said second sealing member projects from said manifold to abut said die plate, and the other end of said second sealing member has a pressure-receiving section facing said molding material supply path.

6. An injection molding die as defined in claim 5, wherein said pressure-receiving section of said second sealing member is tapered at a predetermined angle so that the side toward said supply path has a larger diameter than the side away from said supply path.

7. An injection molding die as defined in claim 2, further comprising a second sealing member mounted on said manifold, where said valve pin passes through said manifold adapted to provide a seal between said manifold and a die plate to which said first die is secured.

8. An injection molding die as defined in claim 7, wherein said second sealing member has a cylindrical shape, said sealing member is mounted on said manifold concentrically with said valve pin, one end of said second sealing member projects from said manifold to abut said die plate, and the other end of said second sealing member has a pressure-receiving section facing said molding material supply path.

9. An injection molding die as defined in claim 8, wherein said pressure-receiving section of said second sealing member is tapered at a predetermined angle so that the side toward said supply path has a larger diameter than the side away from said supply path.

* * * * *